United States Patent [19]

Marko et al.

[11] Patent Number: 5,276,915
[45] Date of Patent: Jan. 4, 1994

[54] TRANSCEIVER HAVING A DIVIDE-DOWN TRANSMIT OFFSET SCHEME

[75] Inventors: Paul D. Marko, Ft. Lauderdale; Jaime A. Borras, Hialeah, both of Fla.

[73] Assignee: Motorola, Inc., Schaumburg, Ill.

[21] Appl. No.: 787,279

[22] Filed: Nov. 4, 1991

[51] Int. Cl.⁵ .............................................. H04B 1/40
[52] U.S. Cl. ........................................ 455/86; 455/76
[58] Field of Search ............... 455/87, 86, 84, 85, 455/76, 75, 73, 78; 331/74; 370/29, 24, 32

[56] References Cited

U.S. PATENT DOCUMENTS

| | | | |
|---|---|---|---|
| 3,324,396 | 6/1967 | Schneider | 455/75 |
| 4,512,035 | 4/1985 | Victor et al. | 455/165 |
| 4,551,856 | 11/1985 | Victor et al. | 455/183 |
| 4,688,261 | 8/1987 | Killoway et al. | 455/76 |
| 4,879,758 | 11/1989 | DeLuca et al. | 455/296 |
| 4,903,257 | 2/1990 | Takeda et al. | 370/29 |
| 4,926,441 | 5/1990 | Iwasaki | 455/116 |
| 5,123,008 | 6/1992 | Beesley | 370/24 |

Primary Examiner—Reinhard J. Eisenzopf
Assistant Examiner—Nguyen Vo
Attorney, Agent, or Firm—Pablo Meles; Thomas G. Berry; Daniel R. Collopy

[57] ABSTRACT

A radio communication device, having a receive mode and a transmit mode, includes a receiver portion, a transmitter portion, and multiple oscillators for providing reference waveforms for the radio communication device. During the receive mode, the receiver portion receives signals having a selected frequency, converts received signals to at least a first intermediate frequency (IF), and a transmitter oscillator produces a first waveform having a frequency equal to a multiple of the first intermediate frequency during the receive mode. During the transmit mode, the transmitter portion requires a reference waveform having an offset frequency equivalent to the first IF frequency to produce a radio frequency signal. Thus, the radio communication device also comprises a divider coupled to the transmitter oscillator for dividing the frequency of the first waveform to the required offset frequency in the transmit mode.

5 Claims, 1 Drawing Sheet

TRANSCEIVER HAVING A DIVIDE-DOWN TRANSMIT OFFSET SCHEME

TECHNICAL FIELD

This invention relates generally to radio communication devices, and more specifically to radio communication devices using time division multiplexing.

BACKGROUND

Many modern communication systems use time division multiplexing. Radios in such multiplexed systems switch rapidly between the receive and transmit modes. Such radios may include oscillators that provide reference waveforms for both the receiver and transmitter portions of the radios. A problem may arise in such radios when an oscillator in the radio produces a signal having a frequency equal to the receive frequency, or to an intermediate frequency of the receiver, because in many cases, the oscillator cannot be turned off sufficiently fast to prevent its output from being received by the receiver when the radio goes into its receive mode. These oscillator signals interfere with the performance of the radio because the receiver receives the oscillator signals instead of desired signals. This phenomenon is known as self-quieting, and is obviously undesirable. One possible solution to the self-quieting problem is to shield the receiver portion of the radio so that the oscillator signals are not received during the receive mode. However, shielding of a receiver requires space and may not be as effective as desired. Thus, a need exists for a method and apparatus for reducing self-quieting that avoids the detriments of shielding.

SUMMARY OF THE INVENTION

Briefly, according to the invention, a radio communication device, having a receive mode and a transmit mode, includes a receiver portion, a transmitter portion, and multiple oscillators for providing reference waveforms for the radio communication device. During the receive mode, the receiver portion receives signals having a selected frequency, converts received signals to at least a first intermediate frequency (IF), and a transmitter oscillator produces a first waveform having a frequency equal to a multiple of the first intermediate frequency during the receive mode. During the transmit mode, the transmitter portion requires a reference waveform having an offset frequency equivalent to the first IF frequency to produce a radio frequency signal. Thus, the radio communication device also comprises a divider coupled to the transmitter oscillator for dividing the frequency of the first waveform to the required offset frequency in the transmit mode.

DETAILED DESCRIPTION OF THE PREFERRED EMBODIMENT

Figure 1:
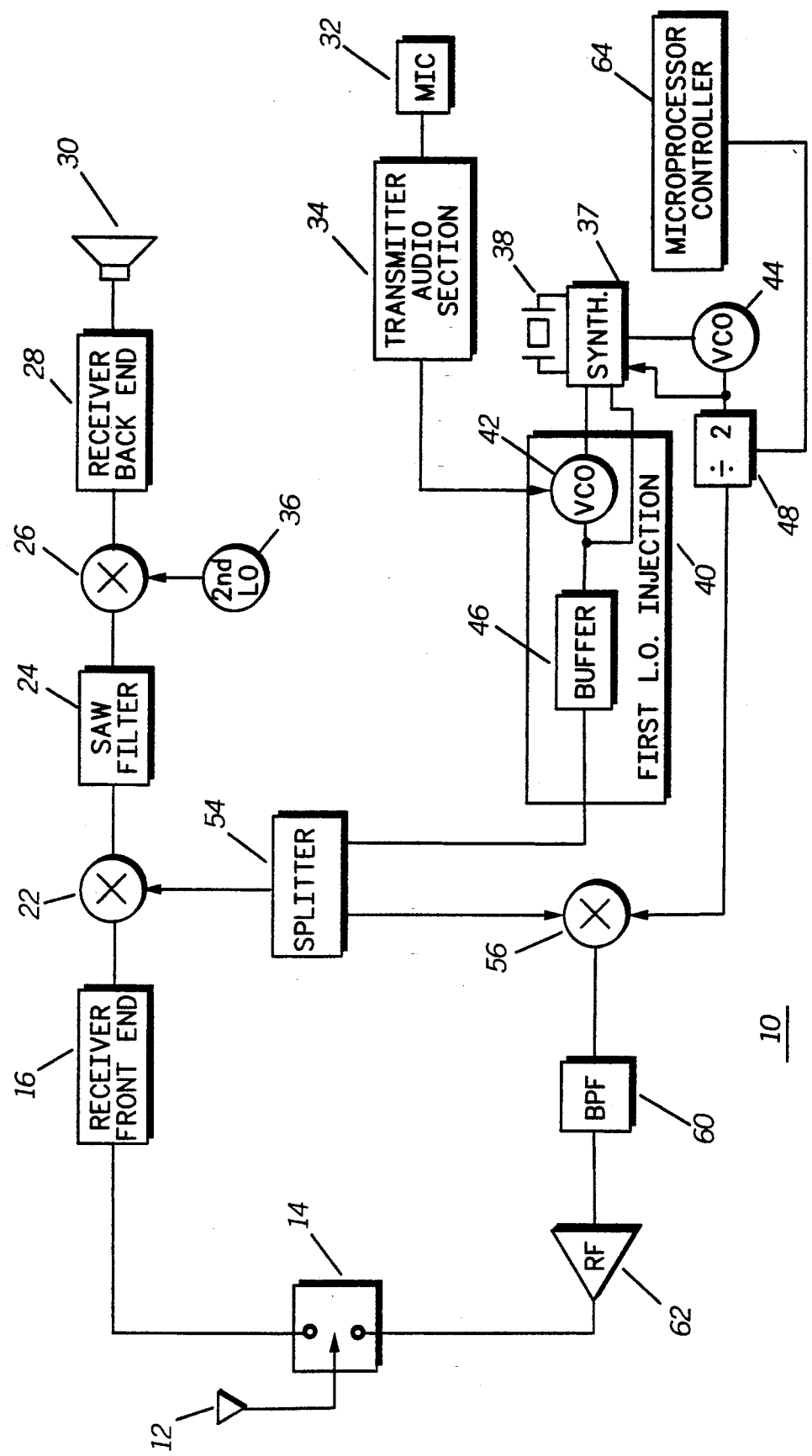
FIG. 1 is a block diagram of a radio transceiver 10 in accordance with the invention.

Referring to FIG. 1, there is shown a radio transceiver 10 using an offset scheme in accordance with the invention. The radio transceiver 10 comprises receiver and transmitter portions. The radio 10 is a time division duplex radio which transmits and receives at the same frequency. Thus, an antenna switch 14 (possibly an integrated circuit) switches periodically between the receive and transmit modes. The radio transceiver 10 further comprises a microprocessor 60 for controlling its operation.

In the receive mode, an antenna 12 receives radio frequency (RF) signals at a frequency selected by its user (e.g., between 864 and 868 MHz). A receiver front end 16 receives the RF signal from the antenna 12 and processes it for mixing with a first injection waveform at mixer 22. The receiver front end 16 includes conventional frequency selective circuitry to select the proper signals. The output of the receiver front end 16 is multiplied with a reference waveform (having a frequency of 819-823 MHz, in this example) at the first mixer 22. The output of the mixer 22 is applied to surface acoustic wave (SAW) filter 24 (having a center frequency of 45 MHz) to produce a first intermediate-frequency (IF) signal. A second down mixer 26 mixes the first IF signal with a 34.3 MHz reference waveform (produced with an oscillator 36). The output of the second mixer is applied to a receiver back end 28 where it is amplified and filtered with a 10.7 MHz bandpass filter (within the receiver back end 28) to produce a second IF signal. A demodulator circuit (also within the receiver back end 28) demodulates the second IF signal and extracts data therefrom to present the data or audio to a user (possibly via a speaker 30).

In the transmit mode, a microphone 32 receives voice signals from the user of the radio 10, and applies them to a transmitter audio section 34. The transmitter audio section 34 includes conventional audio circuitry. The output of the audio section 34 is then applied to an injection circuit 40 at a VCO 42 which operates with a frequency synthesizer 37 to modulate a reference waveform (or carrier) with the information signals provided by the audio section 34. The output of the VCO 42 is buffered (46) to avoid frequency pull problems. A splitter 54 provides output of the buffer 46 to transmitter up-mixer 56 and receiver mixer 22. The mixer 56 multiplies the output of the splitter 54 with a 45 MHz reference waveform to produce a radio-frequency signal for transmission. The mixer 56 drives a bandpass filter 60 (preferably an 866 MHz stripline filter) which removes out-of-band components of the signal provided at the mixer 56. The synthesizer 37 is also coupled to VCO 44 to provide an injection signal to mixer 56. A power amplifier 62 amplifies the output of the bandpass filter 60 to a level suitable for transmission.

The synthesizer 37 is of a conventional design and is coupled to a crystal 38 for synthesizing signals. In accordance with the invention, the VCO 44 provides a waveform having a frequency of 90 MHz. This frequency is twice what is required at the mixer 56 to convert the modulated signal to the transmit frequency. Accordingly, a divide-by-two divider 48 divides the frequency of the output of VCO 44 by two. The frequency in this second loop provides a second frequency being a multiple of the first intermediate frequency or the frequency of the output of the VCO. The divider 48, unlike the VCO 44, can be turned on and off very quickly. Thus, when the radio 10 switches from transmit to receive, the divider 48 is turned off by the microprocessor controller 64. Therefore, during the receive mode the transmitter portion of the transceiver does not produce a 45 MHz waveform and the self-quieting problem is at least reduced.

Therefore, the invention solves the self-quieting problem by operating the transmit oscillator at a multiple of the required frequency during the receive mode, and the output of the oscillator is frequency-divided to the desired frequency in the receive mode.

What is claimed is:

1. A radio transceiver, having a receive mode and a transmit mode, comprising:
    a receiver for receiving signals having a selected frequency, the receiver comprising means for converting received signals to at least one intermediate frequency;
    a transmitter for transmitting signals at said selected frequency;
    oscillator means, coupled to the receiver and to the transmitter, including an output for providing a waveform having a frequency $f_0$ to the transmitter, the frequency $f_0$ being a multiple of the at least one intermediate frequency; and
    divider means, coupled between the output of the oscillator means and the transmitter, for dividing the frequency $f_0$ by a predetermined amount during the transmit mode.

2. The radio transceiver of claim 1 wherein the means for converting received signals to at least one intermediate frequency comprises a mixer.

3. The radio transceiver of claim 1 further comprising switch means for turning off the divider means during the receive mode.

4. A radio transceiver having a receive mode and a transmit mode, the radio transceiver comprising:
    frequency synthesizer means for synthesizing reference waveforms, the frequency synthesizer means including:
    a first loop for providing a first waveform having a first intermediate frequency; and
    a second loop for providing a second reference waveform having a second frequency, the second frequency being a multiple of the first frequency;
    the second loop comprising a divider for dividing the frequency of the second waveform to provide a third waveform having a frequency equal to the first intermediate frequency; and
    switch means coupled to the divider for turning on the divider during the transmit mode and for turning off the divider during the receive mode.

5. In a radio transceiver having a receive mode and a transmit mode, a method for reducing self-quieting comprising:
    providing a reference waveform providing a frequency $f_0$ with an oscillator during the receive mode;
    dividing the frequency $f_0$ using a divider by a predetermined amount during the transmit mode; and
    quickly switching the divider from on to off when said radio transceiver switches from transmit to receive and quickly switching the divider from off to on when said radio transceiver switches from receive to transmit.

* * * * *